United States Patent
McAlynn et al.

(10) Patent No.: US 10,528,904 B2
(45) Date of Patent: Jan. 7, 2020

(54) WORKFLOW PROCESSING VIA POLICY WORKFLOW WORKERS

(71) Applicant: HEWLETT PACKARD ENTERPRISE DEVELOPMENT LP, Houston, TX (US)

(72) Inventors: Michael McAlynn, Belfast (GB); Andrew Robert Reid, Belfast (GB); Krzysztof Ploch, Belfast (GB)

(73) Assignee: MICRO FOCUS LLC, Santa Clara, CA (US)

( * ) Notice: Subject to any disclaimer, the term of this patent is extended or adjusted under 35 U.S.C. 154(b) by 451 days.

(21) Appl. No.: 15/298,844

(22) Filed: Oct. 20, 2016

(65) Prior Publication Data

US 2018/0114157 A1    Apr. 26, 2018

(51) Int. Cl.
*G06Q 10/06*    (2012.01)

(52) U.S. Cl.
CPC ..... *G06Q 10/0633* (2013.01); *G06Q 10/0631* (2013.01)

(58) Field of Classification Search
CPC ....................... G06Q 10/0633; G06Q 10/0631
USPC ........................................................ 705/7.12
See application file for complete search history.

(56) References Cited

U.S. PATENT DOCUMENTS

| | | | | |
|---|---|---|---|---|
| 6,073,109 A * | 6/2000 | Flores | ................... | G06Q 10/10 705/7.13 |
| 6,263,422 B1 | 7/2001 | Wise | | |
| 7,925,527 B1 * | 4/2011 | Flam | ................. | G06F 17/30398 705/7.26 |
| 8,161,486 B2 | 4/2012 | Illmann | | |
| 8,170,897 B1 * | 5/2012 | Cohen | .................... | G06Q 10/06 705/7.13 |
| 9,852,382 B2 * | 12/2017 | Rangaswamy | ........ | G06Q 10/06 |
| 10,193,842 B1 * | 1/2019 | Iyer | ..................... | H04M 3/5191 |
| 2006/0074734 A1 * | 4/2006 | Shukla | ..................... | G06F 8/10 717/107 |
| 2006/0224432 A1 * | 10/2006 | Li | ......................... | G06Q 10/06 705/7.21 |
| 2007/0013948 A1 * | 1/2007 | Bevan | .................. | G06F 3/1214 358/1.15 |
| 2007/0016465 A1 * | 1/2007 | Schaad | ................. | G06Q 10/06 705/7.15 |
| 2007/0208587 A1 * | 9/2007 | Sitaraman | ............. | G06Q 10/10 709/232 |

(Continued)

*Primary Examiner* — Dylan C White

(57) ABSTRACT

Some examples include a machine-readable storage medium with instructions executable by a processing resource of a device to process a file according to a pre-defined workflow. The machine-readable storage medium comprises instructions to receive a message to process the file at a workflow queue, to forward the file, by a policy workflow worker, to a first workflow process worker that corresponds to the file, and to perform, at the first workflow process worker, a first workflow process on the message. The machine-readable storage medium further comprises instructions to return, by the first workflow process worker, the processed message to the workflow queue, wherein the processed message includes the file and a first result, to evaluate, by the policy workflow worker, the processed message against the pre-defined workflow and, based on the evaluation, to forward the processed message, by the policy workflow worker, to a second workflow process worker or an output queue.

17 Claims, 7 Drawing Sheets

(56) References Cited

U.S. PATENT DOCUMENTS

| | | | |
|---|---|---|---|
| 2008/0140792 A1* | 6/2008 | Ouchi | G06Q 10/10 |
| | | | 709/206 |
| 2009/0100407 A1 | 4/2009 | Bouillet | |
| 2012/0215578 A1* | 8/2012 | Swierz, III | G06Q 50/205 |
| | | | 705/7.14 |
| 2015/0264180 A1* | 9/2015 | Wolthuis | H04M 3/5233 |
| | | | 379/265.12 |
| 2016/0371122 A1* | 12/2016 | Nair | G06F 9/505 |
| 2017/0048285 A1* | 2/2017 | Pearl | G06F 17/3007 |
| 2017/0255886 A1* | 9/2017 | Schmidt | G06Q 10/0633 |
| 2017/0337492 A1* | 11/2017 | Chen | G06Q 10/0633 |
| 2018/0232259 A1* | 8/2018 | Chowdhury | G06F 9/5038 |
| 2018/0278567 A1* | 9/2018 | Archer | H04L 51/26 |

* cited by examiner

WORKFLOW PROCESSING VIA POLICY WORKFLOW WORKERS

BACKGROUND

Data may be processed to interpret the data into a form suitable for machines, extract information from the data, help organize the data, perform analytics on the data, and the like. Such data may be processed via a data processing pipeline or workflow. In a data processing pipeline, data may be processed via a series of serially executing actions that comprise a single process.

BRIEF DESCRIPTION OF THE DRAWINGS

The following detailed description references the drawings, wherein.

DETAILED DESCRIPTION

Figure 1:
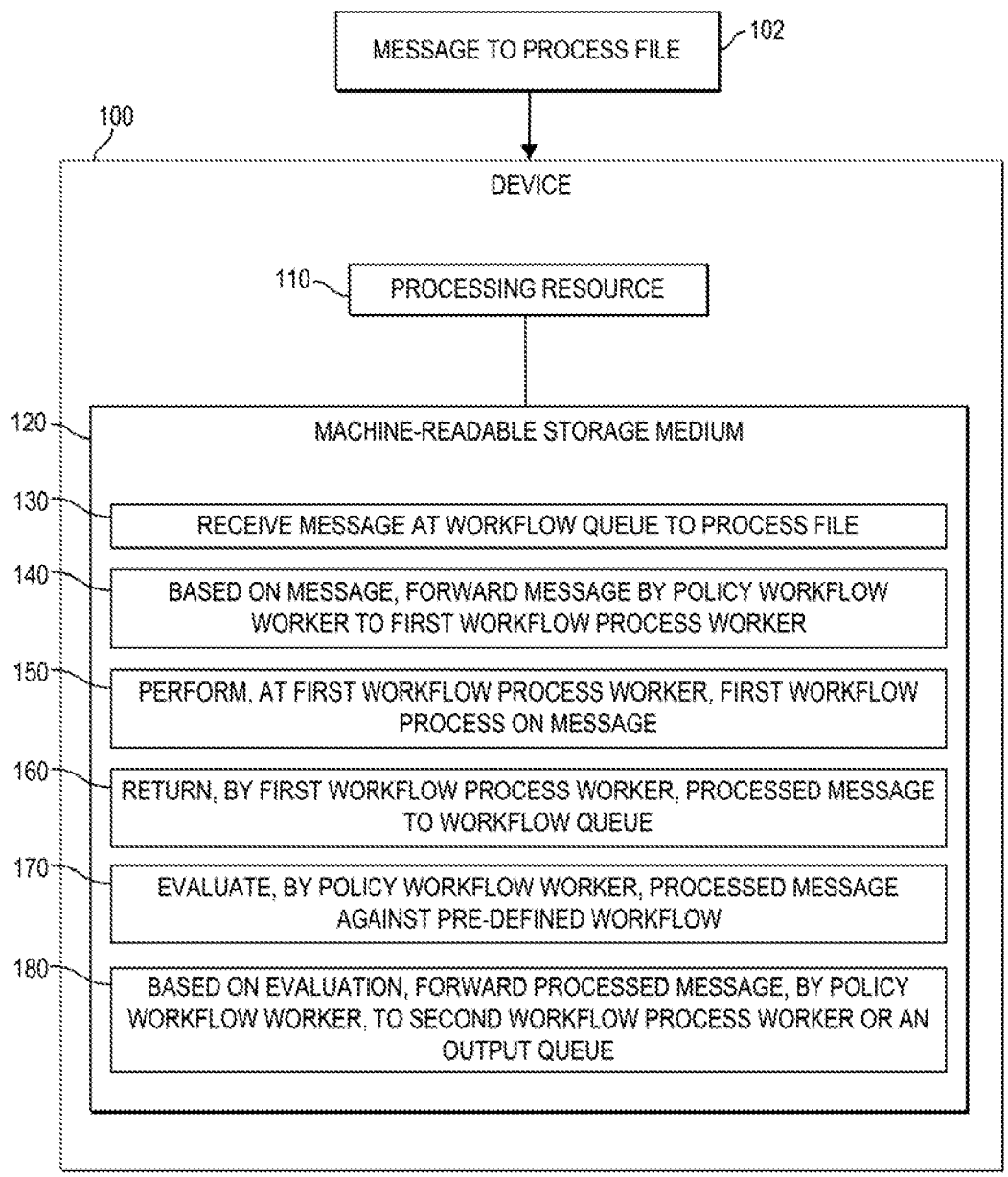
FIG. 1 is a block diagram of an example machine-readable storage medium having instructions executable by a processing resource to process a file according to a pre-defined workflow via a policy workflow worker and a first workflow process worker.

Data processing may involve a variety of data transformation and data extraction activities that enable machines and users to more readily understand, organize, and use the data. For instance, an audio file may be processed to transform portions of the audio to text and then further processed to extract certain categories of information from the text, such as names, addresses, or phone numbers, as desired. In another example, images may be processed to separate photographs of people from photographs of scenery and then may be further processed to recognize faces. In some examples, data processing may be performed via a data processing pipeline or workflow.

In some examples, a data processing pipeline may be a single process and may perform a set of serially executing actions on data. In such examples, data may be processed in a serial manner in the order the data is received. For instance, an audio file that is received before a text file may be processed to completion of the data processing pipeline before the text file is processed. In other examples, the data processing pipeline may use processing modules with individually allocated pipeline processors to allow modules to be flexibly combined. Each processing module may access data from a central repository. These approaches may result in bottlenecks, however, in which computationally-intensive data holds up or stalls the processing of less computationally-intensive data, resulting in a slower and less efficient system. In addition, these approaches may not be easily scalable. For instance, centrally located data may result in data inconsistencies if accessed by multiple processing modules. Moreover, attempts to scale via duplicative data processing pipeline processes may be prohibitively complex and resource-intensive, involving multiple instances of a central database that communicate to ensure data consistency and reliability.

Examples described herein may improve the efficiency, customizability, and scalability of a data processing pipeline, also referred to as a workflow. In some examples described herein, a message may be received at a workflow queue to process a file in accordance with a pre-defined workflow. In some such examples, the file may be retrieved and based (at least in part) on the message and the file, both may be directed by a policy workflow worker to a workflow process worker for performance of an action on the file. The result of the action, along with the file, may be returned as a processed message to the policy workflow worker for further evaluation. Based (at least in part) on the processed message, the policy workflow worker may forward the processed message to another workflow process worker for further action or to an output queue upon completion of the workflow.

In some examples described herein, a processing resource of a device may execute instructions on a machine-readable storage medium to process a file according to a pre-defined workflow. The machine-readable storage medium may be encoded with instructions to receive a message at a workflow queue to process the file. Based on the message, the machine-readable storage medium may further comprise instructions to forward the message, by a policy workflow worker, to a first workflow process worker that corresponds to the file. The first workflow process worker may perform a first workflow process on the message and return the processed message to the workflow queue. In some examples, the processed message includes the file and a first result. The machine-readable storage medium may also comprise instructions to evaluate, by the policy workflow worker, the processed message against the pre-defined workflow, and based on the evaluation, forward the processed message, by the policy workflow worker, to a second workflow process worker or an output queue.

In some such examples, the message may comprise a workflow identifier and a file location and the instructions to forward the message to a first workflow process worker may further comprise instructions to retrieve the file based on the file location, access the pre-defined workflow associated with the workflow identifier, evaluate the file against the pre-defined workflow, and based on a match to a workflow process worker of a plurality of workflow process workers, append to the message a current workflow state. In such examples, the workflow process worker of the plurality of workflow process workers may be the first workflow process worker.

In further such examples, the instructions to evaluate the processed message against the pre-defined workflow may further comprise instructions to associate the first result with the file, update the current workflow state, and determine whether a match exists to another workflow process worker of the plurality of workflow process workers. In such examples, the another workflow process worker may be the second workflow process worker. In yet other such examples, the instructions to forward the processed message to the second workflow process worker may be based on the existence of the match to the another workflow process worker and the instructions to forward the processed message to the output queue may be based on the absence of the match to the another workflow process worker.

In other such examples, the machine-readable storage medium may further comprise instructions to iteratively perform a corresponding workflow process at a corresponding workflow process worker, return the processed message to the workflow queue, and evaluate, by the policy workflow worker, the processed message against the pre-defined workflow until, based on the evaluation, the processed message is forwarded to the output queue. The machine-readable storage medium may also comprise instructions to generate a new first workflow process worker to perform the first workflow process based on a determination that a threshold associated with the first workflow process worker has been met and instructions to generate a new policy workflow worker based on a determination that a threshold associated with the policy workflow worker has been met.

In some examples described herein, a device to process a file according to a pre-defined workflow may comprise a workflow queue, a policy workflow worker, a plurality of workflow process workers, including a first workflow process worker and a second workflow process worker, a processing resource, and a machine-readable storage medium encoded with instructions executable by the processing resource. The machine-readable storage medium comprises instructions to receive a message at the workflow queue to process the file, wherein the message comprises a workflow identifier and a file location and retrieve, at the policy workflow worker, the file based on the file location. Based on the message, the machine-readable storage medium further comprises instructions to forward the message, by the policy workflow worker, to the first workflow process worker that corresponds to the file. The machine-readable storage medium also comprises instructions to perform, at the first workflow process worker, a first workflow process on the message and to return, by the first workflow process worker, the processed message to the workflow queue, wherein the processed message includes the file and a first result. The machine-readable storage medium includes instructions to evaluate, by the policy workflow worker, the processed message against the pre-defined workflow and based on the evaluation, forward the processed message, by the policy workflow worker, to the second workflow process worker or an output queue.

In some examples described herein, a method of processing a file according to a pre-defined workflow may comprise a workflow queue to receive a message to process the file, wherein the message comprises a workflow identifier and a file location. A policy workflow worker, based on the message, forwards the message to a first workflow process worker that corresponds to the file. The first workflow process worker performs a first workflow process on the message and returns the processed message to the workflow queue, wherein the processed message includes the file and a first result. The policy workflow worker evaluates the processed message against the pre-defined workflow and based on the evaluation, forwards the processed message by the policy workflow worker to a second workflow process worker or an output queue. The method of performing a corresponding workflow process at a corresponding workflow process worker, returning the processed message to the workflow queue, and evaluating the processed message against the pre-defined workflow is iteratively performed until, based on the evaluation, the processed message is forwarded to the output queue. In examples described herein, a determination, action, etc., that is said to be "based on" a given condition may be based on that condition alone or based on that condition and other condition(s).

The examples described herein may utilize distributed data, and workflow process workers and policy workflow workers that each comprise a separate process to improve data processing speeds, scalability, and customizability. In some examples described herein, the generation of new workflow process workers and policy workflow workers may further mitigate bottlenecks created in data processing pipelines or workflows and increase data processing speed. By using a policy workflow worker that evaluates a message and forwards the message to a workflow process worker based (at least in part) on the message, the examples described herein may provide substantial efficiencies, and provide real world improvements to data processing.

Referring now to the drawings, FIG. 1 is a block diagram of an example processing resource 110 and a machine-readable storage medium 120 comprising (e.g., encoded with) instructions 130, 140, 150, 160, 170, and 180 executable by processing resource 110 to implement functionalities described herein in relation to FIG. 1. As shown, in the example of FIG. 1, device 100 includes processing resource 110 and a machine-readable storage medium 120 to process a file according to a pre-defined workflow. The functionalities described herein in relation to instructions 130, 140, 150, 160, 170, 180, and any additional instructions described herein in relation to storage medium 120, are implemented at least in part in electronic circuitry (e.g., via any combination of hardware and programming to implement functionalities, as described below).

As used herein, a device may be a desktop computer, laptop (or notebook) computer, workstation, tablet computer, mobile phone, smart device, switch, router, server, blade enclosure, or any other processing device or equipment including a processor or processing resource.

In examples described herein, a processing resource may include, for example, one processor or multiple processors included in a single computing device or distributed across multiple devices. As used herein, a processor may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution instructions stored on a machine-readable storage medium, or a combination thereof.

Processing resource 110 may fetch, decode, and execute instructions stored on storage medium 120 to perform the functionalities described below in relation to instructions 130, 140, 150, 160, 170, and 180. In other examples, the functionalities of any of the instructions of storage medium 120 may be implemented in the form of electronic circuitry, in the form of executable instructions encoded on a machine-readable storage medium, or a combination thereof. The storage medium may be located either in the device executing the machine-readable instructions, as shown in FIG. 1, or remote from but accessible to the device (e.g., via a computer network) for execution. In the example of FIG. 1, storage medium 120 may be implemented by one machine-readable storage medium, or multiple machine-readable storage media.

As used herein, a machine-readable storage medium may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

In the example of FIG. 1, instructions 130 receive, at a workflow queue, a message 102 to process a file. Message 102 is a message to perform an action on the file. In some examples, message 102 is a message to process a file in accordance with a particular workflow, such as the pre-defined workflow. In such examples, message 102 may include a workflow identifier and a file location. As used herein, the workflow identifier may identify the pre-defined workflow by which the file should be processed. The file location, as used herein, may identify the location of the file to be processed.

Message 102 is received at a workflow queue. The workflow queue may be any suitable data structure for receiving and storing messages and other data to be processed or handled by a workflow. In some examples, the workflow queue may be specific to a particular pre-defined workflow. In other examples, the workflow queue may be a catch-all for messages to multiple pre-defined workflows. The queue may employ a first-in-first-out (FIFO) data structure in some instances. In other instances, the queue may allow for allow for messages to be retrieved and processed in a different order from when they are received. As used herein, a file may refer to a resource that stores data or information. In some examples, the file to be processed may be an audio file, an image file, an audiovisual file, a text file, or the like and may include an array of bytes.

Message 102 is received from the workflow queue at a policy workflow worker and based (at least in part) on message 102, instructions 140 forward the message, by the policy workflow worker, to a first workflow process worker. In some examples, a pre-defined workflow may be divided into a plurality of workflow process workers. A pre-defined workflow, as used herein, may refer to a defined set of policies pertaining to various types of files. In some examples, the set of policies may be defined as part of a search request. In other examples, the set of policies may be defined by an administrator on a periodic basis, at set-up, or any other suitable time. These policies may be carried out via a plurality of data processing actions. Each action (or set of actions) of the pre-defined workflow may include a different workflow process worker. A workflow process worker may be specific to a certain type of file or may be applicable to any type of file.

The policy workflow worker may evaluate message 102 and select a first workflow process worker from a plurality of workflow process workers as corresponding to message 102. In some examples, the policy workflow worker may evaluate message 102 against the pre-defined workflow to select the first workflow process worker. In other examples, based (at least in part) on the pre-defined workflow and message 102, the policy workflow worker may automatically forward message 102 to the first workflow process worker. In yet other examples, the policy workflow worker may perform relatively minor or basic processing steps prior to forwarding message 102. The policy workflow worker, as used herein, is implemented as a combination of hardware and programming to receive a message 102 and based (at least in part) on the message, forward the message to an appropriate workflow process worker.

Instructions 150 receive message 102 at the first workflow process worker from the policy workflow worker and perform, at the first workflow process worker, a first workflow process on message 102. Message 102 may include the file to be processed. Alternatively, the first workflow process worker may retrieve the file to be processed based (at least in part) on message 102. Performing the first workflow process on message 102 involves processing the file. In some examples, processing may involve extracting data from archive files, extracting text from audio, video, or image files, language detection, extraction of document properties, detection of user-defined values within a document, detection and/or removal of certain types of data, classification of documents into pre-defined groups, and other types of data transformations and extractions. The first workflow process may involve a single action or a set of actions that is part of the pre-defined workflow. The first workflow process worker, as used herein, is implemented as a combination of hardware and programming to receive a message 102 from the policy workflow worker and perform a first workflow process on the message.

After the first workflow process has been performed on message 102, instructions 160 return the processed message to the workflow queue. The processed message may include the file and the result of the first workflow process, i.e., the first result. For instance, if the file is an audio file and the first workflow process performed a speech recognition process to covert the audio to text, the processed message returned by the first workflow process worker would include the audio file and the text file. In some examples, metadata may be added to the processed message (or updated if already existing) to indicate the action performed, the first result, a current workflow state, or any other information as appropriate.

As described above, the workflow queue may receive and store the processed message in any suitable manner. In some instances, the workflow queue may separately receive and store processed messages from messages that have yet to be forwarded according to the pre-defined workflow. In other examples, the workflow queue may receive and store all messages together regardless of their state of processing.

Instructions 170 receive the processed message at the policy workflow worker and evaluate the processed message against the pre-defined workflow. In some examples, the policy workflow worker may access the pre-defined workflow and compare the message and its current state of processing against any further actions that may be defined in the pre-defined workflow. If the pre-defined workflow does not define any further actions for the processed message, the processed message may be routed to an output queue for storage or for performance of analytics. If the pre-defined workflow defines further actions for the processed message, the processed message may be routed to an appropriate workflow process worker. In some examples, the processed message may be compared against the plurality of workflow process workers that perform the actions of the pre-defined workflow. If there is a match, meaning that the processed message corresponds to a workflow process worker based (at least in part) on the state of processing and/or the pre-defined workflow, the processed message may be forwarded to the workflow process worker. If there is no match, the processed message may be forwarded to an output queue.

By returning the processed message to the workflow queue to allow for evaluation by the policy workflow worker at instructions 160 and 170, messages and their associated files may be dynamically routed through the pre-defined workflow such that certain types of files and/or certain processing actions at workflow process workers do not create a bottleneck in the pre-defined workflow. Rather, multiple workflow process workers may independently perform workflow processes on multiple messages, increasing overall efficiency.

Based (at least in part) on the evaluation at the policy workflow worker, instructions 180 may forward the processed message, by the policy workflow worker, to a second workflow process worker or to an output queue. The second workflow process worker may include a second workflow process that involves a single action or a set of actions that is part of the pre-defined workflow. The action or set of actions may differ from the action or set of actions of the first workflow process and, in some instances, may involve actions to be performed after those of the first workflow process. In other examples, the second workflow process and the first workflow process may involve actions that are similar or the same and may be actions that could be performed concurrently. The second workflow process worker, as used herein, is implemented as a combination of hardware and programming to receive a processed message from the policy workflow worker and perform a second workflow process on the processed message.

In some examples, based (at least in part) on the evaluation by the policy workflow worker, instructions 180 may forward the processed message to an output queue. The output queue, as used herein, may be any suitable data structure for receiving and storing processed messages. The output queue may receive processed messages that have completed processing in accordance with the pre-defined workflow. The output queue may be used as a buffer prior to storage of the processed message. In other examples, the output queue may store the processed messages for the performance of further analytics. In yet other examples, the output queue may act as a cache for recently processed messages.

Pre-defined workflows may be used by organizations and entities to process, analyze, and organize incoming and outgoing data files. For instance, an entity may process text, audio, video, and image files in real-time, or approximating real-time, for time-sensitive information. Files generated in email, instant messenger, voice, video applications, and other similar applications may be processed to extract, recognize, and monitor certain types of information for security purposes, confidentiality purposes, business purposes, and the like. In other examples, organizations or entities may process archived or stored files to extract certain types of information. In such an example, workflows may be used as part of a search engine. For instance, an entity may process archived files via a pre-defined workflow to gather information on certain product sales, while redacting confidential information like credit card numbers.

Instructions 130, 140, 150, 160, 170, and 180 may be part of an installation package that, when installed, may be executed by processing resource 110 to implement the functionalities described above. In such examples, storage medium 120 may be a portable medium, such as a CD, DVD, or flash drive, or a memory maintained by a server from which the installation package can be downloaded and installed. In other examples, instructions 130, 140, 150, 160, 170, and 180 may be part of an application, applications, or component(s) already installed on device 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2-9.

Figure 2:
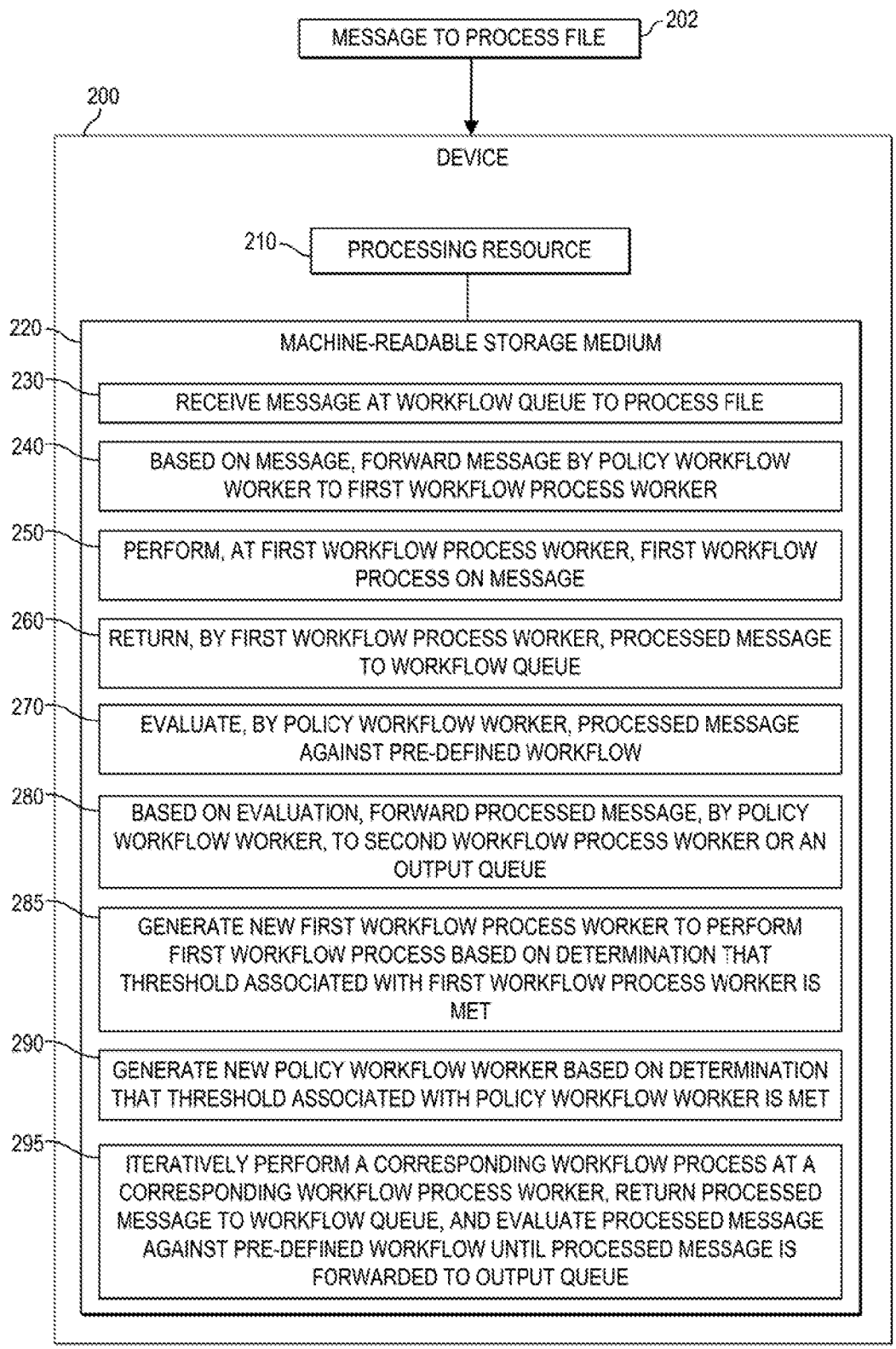
FIG. 2 is a block diagram of an example machine-readable storage medium having instructions executable by a processing resource to process a file according to a pre-defined workflow by generating a new first workflow process worker based on a determination that a threshold associated with a first workflow process worker is met.

Further examples are described with reference to FIG. 2. FIG. 2 is a block diagram of an example processing resource 210 and a machine-readable storage medium 220 comprising (e.g., encoded with) instructions 230, 240, 250, 260, 270, 280, 285, 290, and 295 executable by processing resource 210 to implement functionalities described herein in relation to FIG. 2. Device 200 includes processing resource 210 and a machine-readable storage medium 220 to process a file according to a pre-defined workflow. The storage medium may be located either in the device executing the machine-readable instructions, as shown in FIG. 2, or remote from but accessible to the device (e.g., via a computer network) for execution. The functionalities described herein in relation to instructions 230, 240, 250, 260, 270, 280, 285, 290, 295, and any additional instructions described herein in relation to storage medium 220 (e.g., instructions 241, 242, 243, and 244 of FIG. 3 and instructions 271, 272, and 273 of FIG. 4), are implemented at least in part in electronic circuitry (e.g., via any combination of hardware and programming to implement functionalities, as described below).

Instructions 230 receive a message 202 at a workflow queue to process a file, as described above in relation to instructions 130 and message 102 of FIG. 1. In some examples, message 202 includes a workflow identifier and a file location. The policy workflow worker receives message 202 from the workflow queue and based (at least in part) on message 202, instructions 240 forward the message from the policy workflow worker to a first workflow process worker that corresponds to the file, as described above in relation to instructions 140 of FIG. 1. In some examples, instructions 240 may further comprise instructions 241, 242, 243, and 244, as depicted in FIG. 3.

Figure 3:
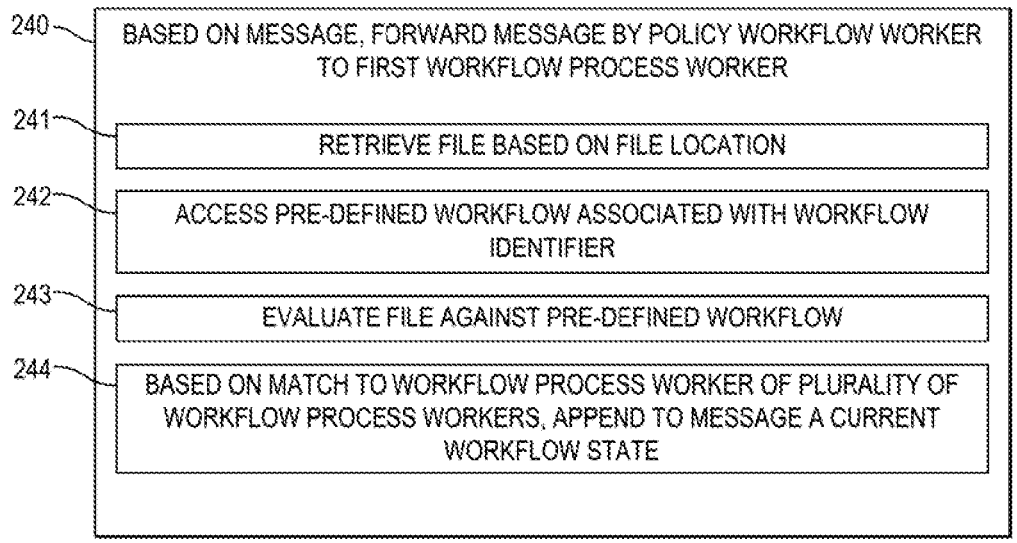
FIG. 3 is a block diagram of example instructions to forward a message by a policy workflow worker to a first workflow process worker based on the message.

Referring to FIG. 3, instructions 241 retrieve the file by the policy workflow worker based (at least in part) on the file location in message 202. Upon retrieving the file, the file may be appended to message 202. In other examples, message 202 may be regenerated to include the file. Both message 202 and the file are passed together from the policy workflow worker to the various workflow process workers until the completion of the pre-defined workflow. Instructions 242 of FIG. 3 access the pre-defined workflow associated with the workflow identifier in message 202. As described above, the pre-defined workflow may be a defined set of policies pertaining to various types of files. In some examples, the pre-defined workflow may be located at a central data repository. Instructions 242 may access the pre-defined workflow at the central data repository and store a copy locally. In other examples, instructions 242 may not make a local copy and may instead access the pre-defined workflow at the central data repository whenever needed.

Instructions 243 evaluate the file against the pre-defined workflow. In some examples, the file may be compared against the pre-defined workflow and the workflow process workers to determine an action to be performed on the file. Based (at least in part) on a match to a workflow process worker of the plurality of workflow process workers, instructions 244 append a current workflow state to the message and ultimately forward the message to the matched workflow process worker. In some examples, the matched workflow process worker is the first workflow process worker. The current workflow state, as used herein, indicates a state of processing in accordance with the pre-defined workflow. In some instances, the current workflow state may indicate which workflow process worker the message is currently being sent to. In other instances, the current workflow state may indicate each workflow process worker the message has been sent to. The current workflow state may also indicate whether a workflow process has been completed or is yet to be completed.

Referring again to FIG. 2, instructions 250 perform, at the first workflow process worker, a first workflow process on message 202, as described above in relation to instructions 150 of FIG. 1. Instructions 260 return, by the first workflow process worker, the processed message to the workflow queue, as described above in relation to instructions 160 of FIG. 1. The processed message includes the file and a first result of the first workflow process. The policy workflow worker receives the processed message from the workflow queue and instructions 270 evaluate, by the policy workflow worker, the processed message against the pre-defined workflow, as described above in relation to instructions 170 of FIG. 1. The policy workflow worker may access the pre-defined workflow at a central data repository or it may access its local copy of the pre-defined workflow. In some examples, instructions 270 may further comprise instructions 271, 272, and 273, as depicted in FIG. 4.

Figure 4:
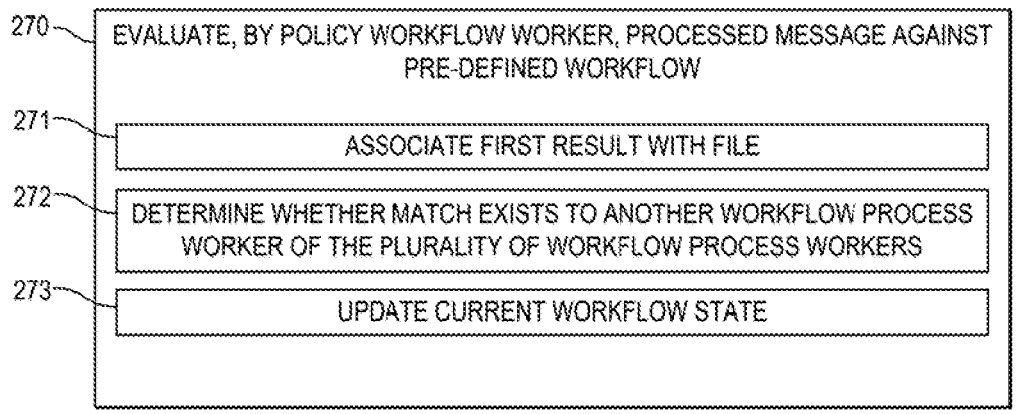
FIG. 4 is a block diagram of example instructions to evaluate, by a policy workflow worker, a processed message against a pre-defined workflow.

Instructions 271 of FIG. 4 associate the first result of the first workflow process with the file. In some examples, metadata may associate the first result with the file. Metadata may be added to the file, the first result, or both. In some instances, the results of processing by each workflow process worker may be associated with the file via metadata. Tags may also be used to associate the first result with the file.

Instructions 272 of FIG. 4 determine whether a match exists between the processed message and another workflow process worker of the plurality of workflow process workers. In some examples, the another workflow process worker is a second workflow process worker. Instructions 272 may compare the processed message against the pre-defined workflow and/or the plurality of workflow process workers to determine whether a match exists.

Instructions 273 update the current workflow state. In some instances, the current workflow state may indicate the workflow process worker to which the message will be sent or the workflow process that has just been completed. In other instances, the current workflow state may indicate each workflow process worker the message has been sent to. The current workflow state may also indicate whether a workflow process has been completed or is yet to be completed.

Referring again to FIG. 2, instructions 280 may forward the processed message, by the policy workflow worker, to the second workflow process worker or to an output queue based (at least in part) on the evaluation of the processed message against the pre-defined workflow, as described above in relation to instructions 180 of FIG. 1. As an example, if a match exists to another workflow process worker (i.e., the second workflow process worker), instructions 280 may forward the processed message to the second workflow process worker based (at least in part) on the existence of the match. If, however, a match does not exist to another workflow process worker, instructions 280 may forward the processed message to an output queue based (at least in part) on the absence of the match. As discussed above in relation to FIG. 1, the output queue may be any suitable data structure for receiving and storing processed messages. The output queue may receive processed messages that have completed processing in accordance with the pre-defined workflow.

In some examples, instructions 285 of FIG. 2 may generate a new first workflow process worker to perform the first workflow process based (at least in part) on a determination that a threshold associated with the first workflow process worker has been met. As an example, the threshold associated with the first workflow process worker may be an amount of time a message is pending before the first workflow process worker performs the first workflow process on the message. The threshold may also be an amount of time to completion of the first workflow process. In another example, the threshold may be a number of messages in a queue for the first workflow process worker. When the threshold has been met, a new first workflow process worker may be generated to increase processing efficiency and mitigate any bottlenecks at the first workflow process worker.

The new first workflow process worker may be identical to the first workflow process worker. Messages directed to the first workflow process worker may be sent to either the first workflow process worker or the new first workflow process worker to speed up processing. Conversely, if multiple first workflow process workers are performing at a certain amount under the threshold, a first workflow process worker may be removed. Though instructions 285 refer to a first workflow process worker, further instructions may generate (or remove) additional workflow process workers of the plurality of workflow process workers based (at least in part) on a determination that a threshold associated with that workflow process worker has been met (or has not been met by a certain amount). Thus, the number of workflow process workers may be automatically and elastically scaled to dynamically allocate or de-allocate resources, as appropriate.

Similarly, in some examples, instructions 290 may generate a new policy workflow worker based (at least in part) on a determination that a threshold associated with the policy workflow worker has been met. The threshold may be an amount of time that a message waits in the workflow queue or a number of messages in the workflow queue. In another example, the threshold may be an amount of time the policy workflow worker takes to complete evaluating the message. When the threshold has been met, a new policy workflow worker may be generated to increase efficiency and mitigate any bottlenecks at the policy workflow worker.

The new policy workflow worker may be identical to the original policy workflow worker. Messages directed to the policy workflow worker may be sent to either of the policy workflow workers to speed up processing. Conversely, if multiple policy workflow workers are performing at a certain amount under the threshold, a policy workflow worker may be removed. Thus, the number of policy workflow workers may be automatically and elastically scaled to dynamically allocate or de-allocate resources, as appropriate.

Instructions 295 may iteratively perform portions of instructions 250, 260, 270, and 280 until the processed message is forwarded to the output queue. For instance, when the policy workflow worker forwards the processed message to the second workflow process worker, a corresponding workflow process may be performed (i.e., a second workflow process) on the processed message. The processed message may then be returned to the workflow queue. In such an example, the processed message may include the file, the first result from the first workflow process and the second result from the second workflow process. The policy workflow worker may receive this processed message and evaluate the processed message against the pre-defined workflow. If, based (at least in part) on the evaluation, it is determined that a match exists between the processed message and a workflow process worker of the plurality of workflow process workers, the processed message may be forwarded to the corresponding workflow process worker and portions of instructions 250, 260, 270, and 280 may again iterate. If, however, based (at least in part) on the evaluation, it is determined that no match exists between the processed message and the plurality of workflow process workers, the processed message may be forwarded to the output queue.

By iteratively performing portions of instructions 250, 260, 270, and 280, messages and their associated files may be dynamically routed through the pre-defined workflow such that certain types of files and/or certain processing actions at workflow process workers do not create bottlenecks in the pre-defined workflow. Rather, multiple workflow process workers may independently perform workflow processes on multiple messages, increasing overall efficiency.

Instructions 230, 240, 250, 260, 270, 280, 285, 290, 295, and any additional instructions described herein (e.g., instructions 241, 242, 243, and 244 of FIG. 3 and instructions 271, 272, and 273 of FIG. 4) may be part of an installation package that, when installed, may be executed by processing resource 210 to implement the functionalities described above. In such examples, storage medium 220 may be a portable medium, such as a CD, DVD, or flash drive, or a memory maintained by a server from which the installation package can be downloaded and installed. In other examples, instructions 230, 240, 250, 260, 270, 280, 285, 290, 295, and any additional instructions described herein (e.g., instructions 241, 242, 243, and 244 of FIG. 3 and instructions 271, 272, and 273 of FIG. 4) may be part of an application, applications, or component(s) already installed on device 200 including processing resource 210. In such examples, the storage medium 220 may include memory such as a hard drive, solid state drive, or the like. In some examples, functionalities described herein in relation to FIGS. 2-4 may be provided in combination with functionalities described herein in relation to any of FIGS. 1 and 5-9.

Figure 5:
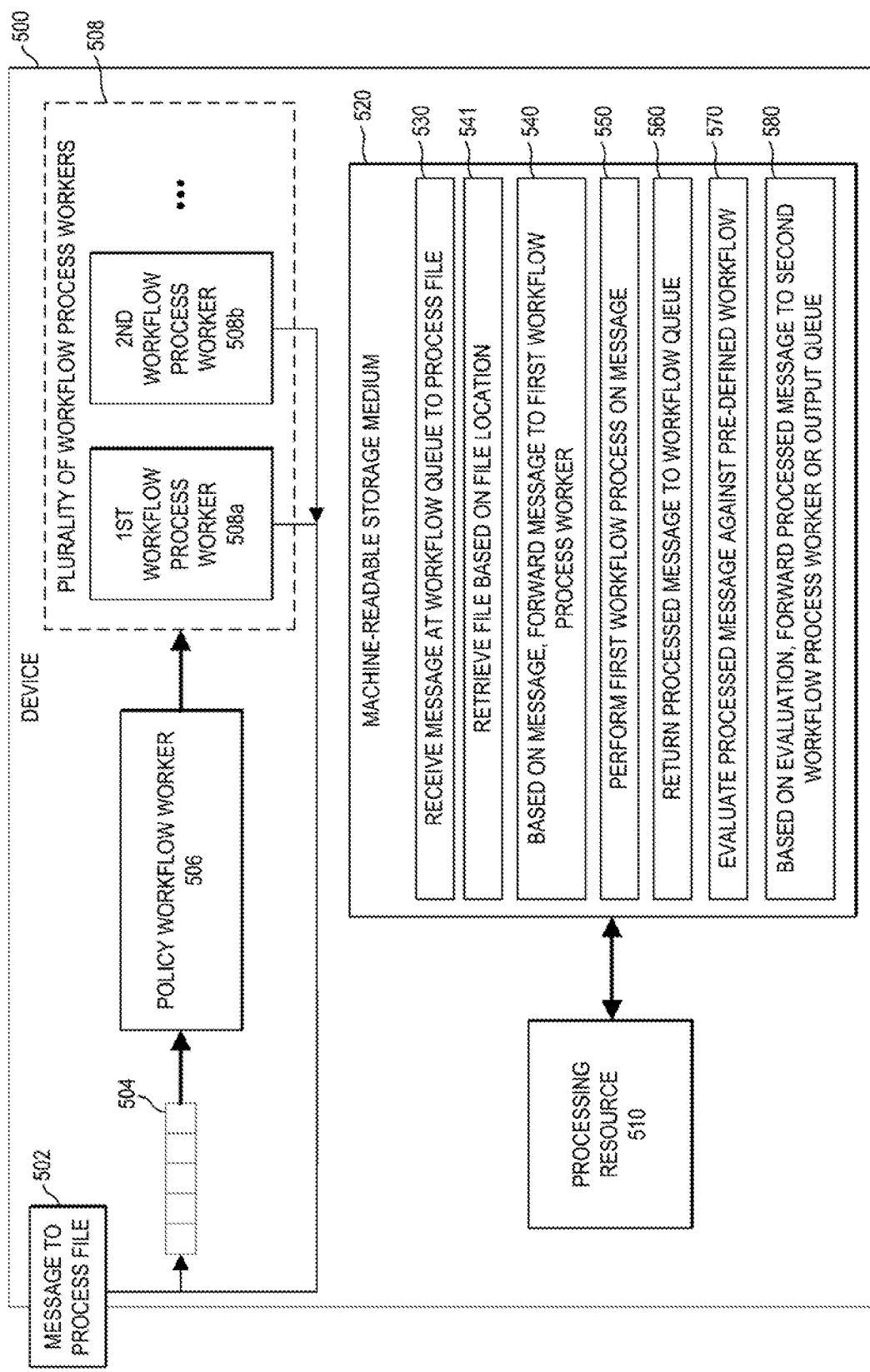
FIG. 5 is a block diagram of an example device comprising a workflow queue, a policy workflow worker, a plurality of workflow process workers, a processing resource, and a machine-readable storage medium having instructions to process a file according to a pre-defined workflow via the policy workflow worker and a first workflow process worker.

Further examples are described herein in relation to FIGS. 5-8. FIG. 5 is a block diagram of an example device 500 comprising a workflow queue 504, a policy workflow worker 506, a plurality of workflow process workers 508, including a first workflow process worker 508a and a second workflow process worker 508b, a processing resource 510, and a machine-readable storage medium 520. Machine-readable storage medium 520 comprises (e.g., is encoded with) instructions 530, 540, 541, 550, 560, 570, and 580 executable by processing resource 510 to implement functionalities described herein in relation to FIG. 5. Device 500 includes processing resource 510 and a machine-readable storage medium 520 to process a file according to a pre-defined workflow. The functionalities described herein in relation to instructions 530, 540, 541, 550, 560, 570, 580, and any additional instructions described herein in relation to storage medium 520 are implemented at least in part in electronic circuitry (e.g., via any combination of hardware and programming to implement functionalities, as described below).

Instructions 530 receive a message 502 at workflow queue 504 to process a file, as described above in relation to instructions 130 and message 102 of FIG. 1. In some examples, message 502 includes a workflow identifier and a file location. Policy workflow worker 506 receives message 502 from workflow queue 504 and based (at least in part) on the file location in message 502, instructions 541 retrieve the file at policy workflow worker 506, as described above in relation to instructions 241 of FIG. 3. Based (at least in part) on message 502, which includes the file, instructions 540 forward the message from policy workflow worker 506 to first workflow process worker 508a that corresponds to the file, as described above in relation to instructions 140 of FIG. 1. In some examples, instructions 540 may further comprise instructions 542, 543, and 544, as depicted in FIG. 6.

Figure 6:
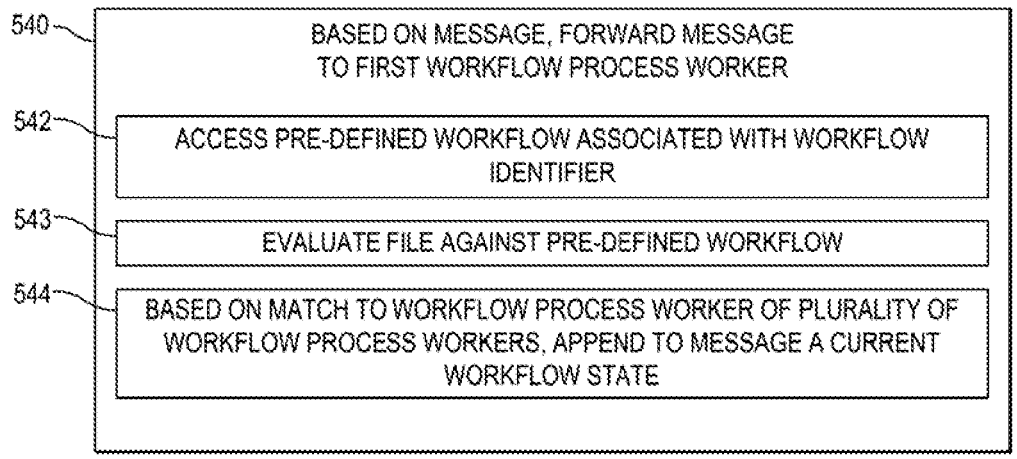
FIG. 6 is a block diagram of example instructions to forward a message by a policy workflow worker to a first workflow process worker based on the message.

Referring to FIG. 6, instructions 542 access the pre-defined workflow associated with the workflow identifier in message 502, as described above in relation to instructions 242 of FIG. 3. Instructions 543 evaluate the file against the pre-defined workflow, as described above in relation to instructions 243 of FIG. 3. Based (at least in part) on a match to first workflow process worker 508a of the plurality of workflow process workers 508, instructions 544 append a current workflow state to the message and ultimately forward the message to first workflow process worker 508a, as described above in relation to instructions 244 of FIG. 3.

Referring again to FIG. 5, instructions 550 perform, at first workflow process worker 508a, a first workflow process on message 502, as described above in relation to instructions 150 of FIG. 1. Instructions 560 return, by first workflow process worker 508a, the processed message to workflow queue 504, as described above in relation to instructions 160 of FIG. 1. The processed message includes the file and a first result of the first workflow process. Policy workflow worker 506 receives the processed message from workflow queue 504 and instructions 570 evaluate, by policy workflow worker 506, the processed message against the pre-defined workflow, as described above in relation to instructions 170 of FIG. 1. In some examples, instructions 570 may further comprise instructions 571, 572, and 573, as depicted in FIG. 7.

Figure 7:
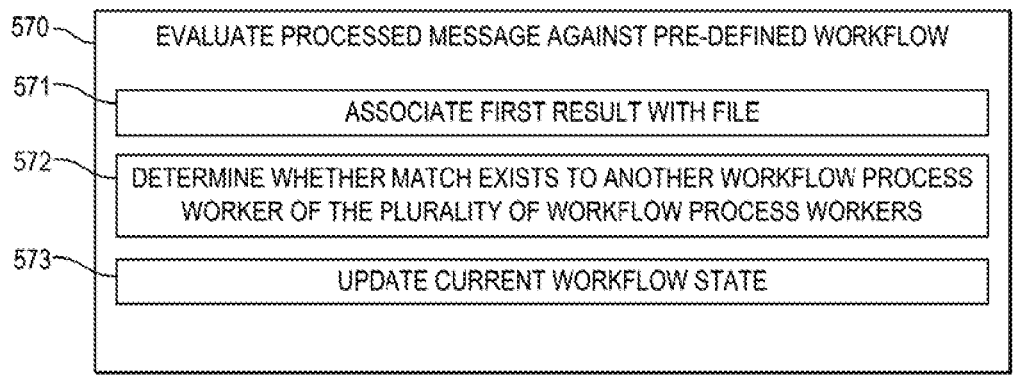
FIG. 7 is a block diagram of example instructions to evaluate, by a policy workflow worker, a processed message against a pre-defined workflow.

Instructions 571 of FIG. 7 associate the first result of the first workflow process with the file, as described above in relation to instructions 271 of FIG. 4. Instructions 572 determine whether a match exists between the processed message and another workflow process worker of the plurality of workflow process workers 508, wherein the another workflow process worker is second workflow process worker 508b, as described above in relation to instructions 272 of FIG. 4. Instructions 573 update the current workflow state, as described above in relation to instructions 273 of FIG. 4.

Returning to FIG. 5, instructions 580 may forward the processed message, by policy workflow worker 506, to second workflow process worker 508*b* or to an output queue based (at least in part) on the evaluation of the processed message against the pre-defined workflow, as described above in relation to instructions 180 of FIG. 1.

Instructions 530, 540, 541, 550, 560, 570, 580, and any additional instructions described herein (e.g., instructions 542, 543, and 544 of FIG. 6 and instructions 571, 572, and 573 of FIG. 7) may be part of an installation package that, when installed, may be executed by processing resource 510 to implement the functionalities described above. In such examples, storage medium 520 may be a portable medium, such as a CD, DVD, or flash drive, or a memory maintained by a server from which the installation package can be downloaded and installed. In other examples, instructions 530, 540, 541, 550, 560, 570, 580, and any additional instructions described herein (e.g., instructions 542, 543, and 544 of FIG. 6 and instructions 571, 572, and 573 of FIG. 7) may be part of an application, applications, or component(s) already installed on device 500 including processing resource 510. In such examples, the storage medium 520 may include memory such as a hard drive, solid state drive, or the like. In some examples, functionalities described herein in relation to FIGS. 5-7 may be provided in combination with functionalities described herein in relation to any of FIGS. 1-4 and 8-9.

Figure 8:
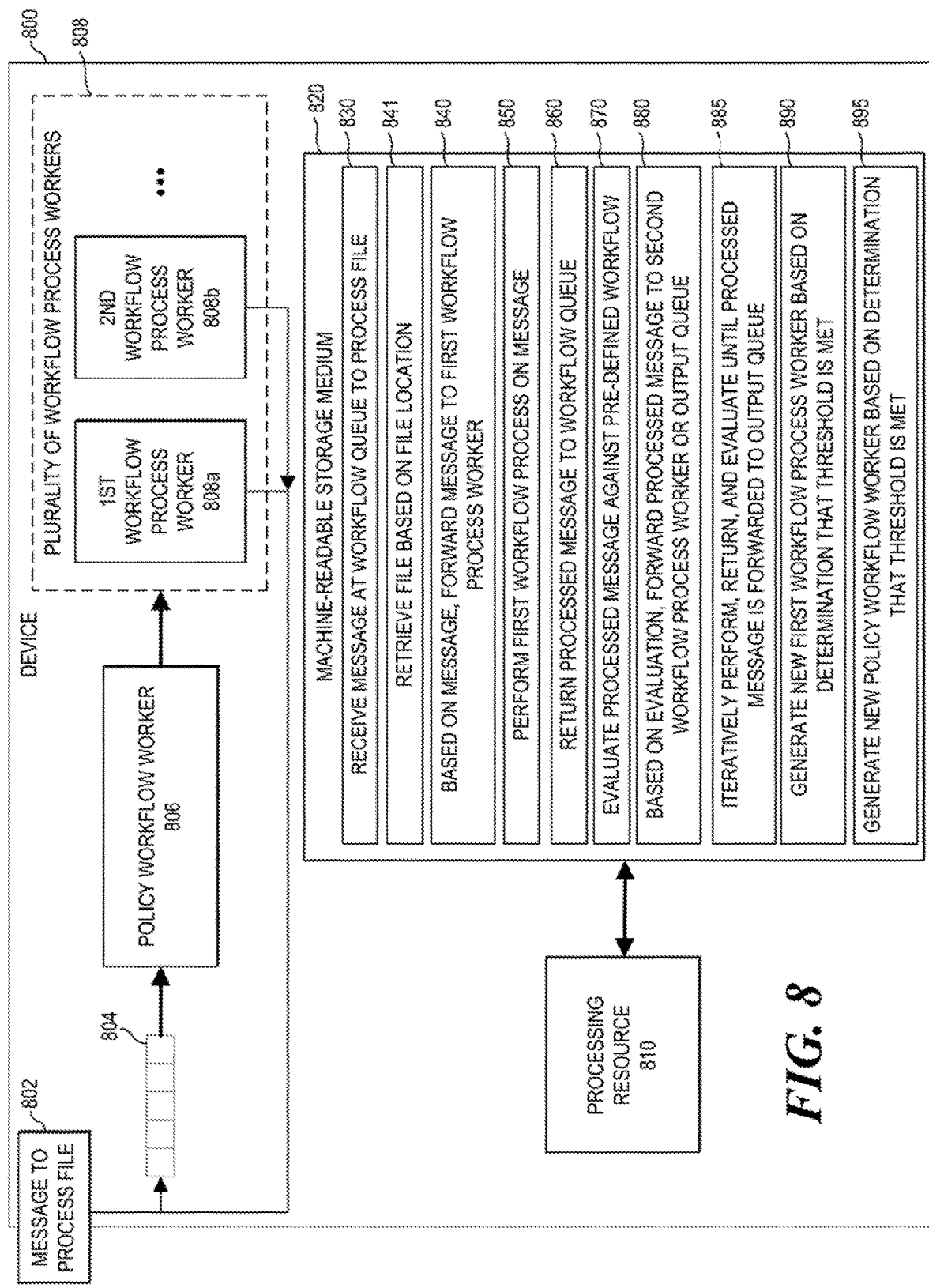
FIG. 8 is a block diagram of an example device comprising a workflow queue, a policy workflow worker, a plurality of workflow process workers, a processing resource, and a machine-readable storage medium having instructions to process a file by generating a new first workflow process worker based on a determination that a threshold associated with a first workflow process worker is met.

FIG. 8 is a block diagram of an example device 800 comprising a workflow queue 804, a policy workflow worker 806, a plurality of workflow process workers 808, including a first workflow process worker 808*a* and a second workflow process worker 808*b*, a processing resource 810, and a machine-readable storage medium 820. Machine-readable storage medium 820 comprises (e.g., encoded with) instructions 830, 840, 841, 850, 860, 870, 880, 885, 890, and 895 executable by processing resource 810 to implement functionalities described herein in relation to FIG. 8. Device 800 includes processing resource 810 and a machine-readable storage medium 820 to process a file according to a pre-defined workflow. The functionalities described herein in relation to instructions 830, 840, 841, 850, 860, 870, 880, 885, 890, 895, and any additional instructions described herein in relation to storage medium 820 are implemented at least in part in electronic circuitry (e.g., via any combination of hardware and programming to implement functionalities, as described below).

Instructions 830 receive a message 802 at workflow queue 804 to process a file, as described above in relation to instructions 130 and message 102 of FIG. 1. In some examples, message 802 includes a workflow identifier and a file location. Policy workflow worker 806 receives message 802 from workflow queue 804 and based (at least in part) on the file location in message 802, instructions 841 retrieve the file at policy workflow worker 806, as described above in relation to instructions 241 of FIG. 3. Based (at least in part) on message 802, which includes the file, instructions 840 forward the message from policy workflow worker 806 to first workflow process worker 808*a* that corresponds to the file, as described above in relation to instructions 140 of FIG. 1. In some examples, instructions 840 may further comprise instructions 542, 543, and 544, as depicted in FIG. 6 and described above.

Instructions 850 of FIG. 8 perform, at first workflow process worker 808*a*, a first workflow process on message 802, as described above in relation to instructions 150 of FIG. 1. Instructions 860 return, by first workflow process worker 808*a*, the processed message to workflow queue 804, as described above in relation to instructions 160 of FIG. 1. The processed message includes the file and a first result of the first workflow process. Policy workflow worker 806 receives the processed message from workflow queue 804 and instructions 870 evaluate, by policy workflow worker 806, the processed message against the pre-defined workflow, as described above in relation to instructions 170 of FIG. 1. In some examples, instructions 870 may further comprise instructions 571, 572, and 573, as depicted in FIG. 7 and described above.

Instructions 880 of FIG. 8 may forward the processed message, by policy workflow worker 806, to second workflow process worker 808*b* or to an output queue based (at least in part) on the evaluation of the processed message against the pre-defined workflow, as described above in relation to instructions 180 of FIG. 1. Instructions 885 iteratively perform a corresponding workflow process at a corresponding workflow process worker, return the processed message to workflow queue 804, and evaluate the processed message against the pre-defined workflow until, based (at least in part) on the evaluation, the processed message is forwarded to the output queue, as described above in relation to instructions 285 of FIG. 2. Instructions 890 and 895 generate a new workflow process worker and a new policy workflow worker based (at least in part) on determinations that thresholds associated with first workflow policy worker 808*a* and policy workflow worker 806, respectively, have been met, as described above in relation to instructions 290 and 295 of FIG. 2.

Instructions 830, 840, 841, 850, 860, 870, 880, 885, 890, 895, and any additional instructions described herein (e.g., instructions 542, 543, and 544 of FIG. 6 and instructions 571, 572, and 573 of FIG. 7) may be part of an installation package that, when installed, may be executed by processing resource 810 to implement the functionalities described above. In such examples, storage medium 820 may be a portable medium, such as a CD, DVD, or flash drive, or a memory maintained by a server from which the installation package can be downloaded and installed. In other examples, instructions 830, 840, 841, 850, 860, 870, 880, 885, 890, 895, and any additional instructions described herein (e.g., instructions 542, 543, and 544 of FIG. 6 and instructions 571, 572, and 573 of FIG. 7) may be part of an application, applications, or component(s) already installed on device 800 including processing resource 810. In such examples, the storage medium 820 may include memory such as a hard drive, solid state drive, or the like. In some examples, functionalities described herein in relation to FIGS. 6-8 may be provided in combination with functionalities described herein in relation to any of FIGS. 1-5 and 9.

Figure 9:
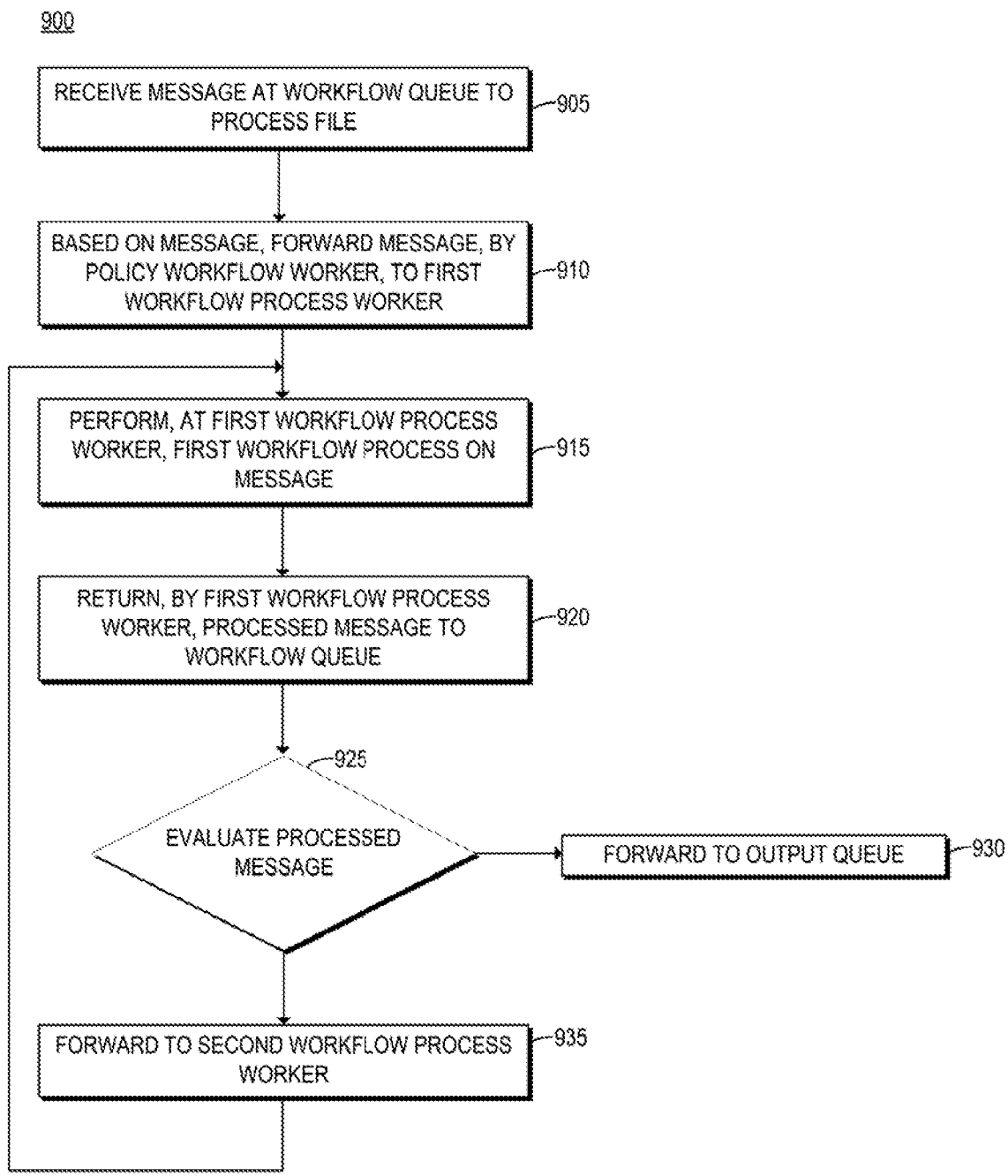
FIG. 9 is a flowchart of an example method of processing a file according to a pre-defined workflow including forwarding a message to process the file by a policy workflow worker to a first workflow process worker based on the message.

FIG. 9 is a flowchart of an example method 900 of processing a file according to a pre-defined workflow. Execution of method 900 is described below with reference to device 200 of FIG. 2. Implementation of method 900 is not limited to such an example however (e.g., device 100 of FIG. 1, device 500 of FIG. 5, etc.).

In the example of FIG. 9, method 900 may be a method of device 200. At 905, a message to process a file may be received at a workflow queue. This receipt may be performed as described above in relation to instructions 230 of FIG. 2. In some examples, the message includes a workflow identifier and a file location. Based (at least in part) on the message, at 910, the policy workflow worker forwards the message to a first workflow process worker, as described above in relation to instructions 240 of FIG. 2. In some examples, forwarding the message to a first workflow process worker may include retrieving the file based (at least in part) on the file location, accessing a pre-defined workflow associated with the workflow identifier, evaluating the file against the pre-defined workflow, and based (at least in part) on a match to a workflow process worker of a plurality of workflow process workers, appending a current workflow state to the message. These actions may be performed as described above in relation to instructions 241, 242, 243, and 244 of FIG. 3.

At 915, the first workflow process worker performs a first workflow process on the message, as described above in relation to instructions 250 of FIG. 2. At 920, the first workflow process worker returns a processed message to the workflow queue, as described above in relation to instructions 260 of FIG. 2. The processed message may include the file and a first result of the first workflow process. At 925, the policy workflow worker evaluates the processed message against the pre-defined workflow. In some examples, evaluating the processed message may include associating the first result with the file, determining whether a match exists to another workflow process worker of the plurality of workflow process workers, and updating the current workflow state. These actions may be performed as described above in relation to instructions 271, 272, and 273 of FIG. 4.

Based (at least in part) on the evaluation, for instance when a match does not exist to another workflow process worker, method 900 may proceed to 930 and the policy workflow worker may forward the processed message to an output queue, as described above in relation to instructions 280 of FIG. 2. Based (at least in part) on the evaluation, for instance when a match does exist to another workflow process worker such as a second workflow process worker, method 900 may proceed to 935 and the policy workflow worker may forward the processed message to the second workflow process, as described above in relation to instructions 280 of FIG. 2.

At 935, method 900 may iteratively return to 915 and perform portions of 915, 920, and 925 until the processed message is forwarded to the output queue. Method 900 may iteratively perform a corresponding workflow process at a corresponding workflow process worker, return the processed message to the workflow queue, and evaluate the processed message against the pre-defined workflow until, based (at least in part) on the evaluation, the processed message is forwarded to the output queue, as described above in relation to instructions 295 of FIG. 2.

In some examples, method 900 may also include (not shown) generating a new first workflow process worker to perform the first workflow process based (at least in part) on a determination that a threshold associated with the first workflow process worker has been met, as described above in relation to instructions 285 of FIG. 2 and generating a new policy workflow worker based (at least in part) on a determination that a threshold associated with the policy workflow worker has been met, as described above in relation to instructions 290 of FIG. 2.

Although the flowchart of FIG. 9 shows a specific order of performance of certain functionalities, method 900 may not be limited to that order. For example, the functionalities shown in succession in the flowchart may be performed in a different order, may be executed concurrently or with partial concurrence, or a combination thereof. In some examples, functionalities described herein in relation to FIG. 9 may be provided in combination with functionalities described herein in relation to any of FIGS. 1-8.

What is claimed is:

1. A non-transitory machine-readable storage medium storing instructions executable by a processing resource of a device to process a file according to a pre-defined workflow, the non-transitory machine-readable storage medium comprising instructions to cause the processing resource to:
    receive a message at a workflow queue to process the file, wherein the message comprises a workflow identifier that identifies the pre-defined workflow and a file location that identifies a location of the file;
    based on the workflow identifier and the file location in the message, forward the message, by a policy workflow worker, from the workflow queue to a first workflow process worker that corresponds to the file;
    perform, at the first workflow process worker, a first workflow process on the message;
    return, by the first workflow process worker, the processed message to the workflow queue, wherein the processed message includes the file and a first result;
    evaluate, by the policy workflow worker, the processed message against the pre-defined workflow;
    based on the evaluation, forward the processed message, by the policy workflow worker, to a second workflow process worker or an output queue; and
    in response to a determination that an amount of time that the first workflow process worker spent to process the message was greater than a threshold, generate an additional workflow process worker to assist the first workflow process worker to process messages from the workflow queue to increase processing efficiency and mitigate bottlenecks at the first workflow process worker.

2. The non-transitory machine-readable storage medium of claim 1, wherein to forward the message to the first workflow process worker, the instructions are executable to cause the processing resource to:
    retrieve the file based on the file location;
    access the pre-defined workflow associated with the workflow identifier;
    evaluate the file against the pre-defined workflow; and
    based on a match to a workflow process worker of a plurality of workflow process workers, append to the message a current workflow state, wherein the workflow process worker is the first workflow process worker.

3. The non-transitory machine-readable storage medium of claim 2, wherein to evaluate the processed message against the pre-defined workflow, the instructions are executable to cause the processing resource to:
    associate the first result with the file;
    determine whether a match exists to another workflow process worker of the plurality of workflow process workers, wherein the another workflow process worker is the second workflow process worker; and
    update the current workflow state.

4. The non-transitory machine-readable storage medium of claim 3, wherein forwarding the processed message to the second workflow process worker is based on the existence of the match to the another workflow process worker and wherein forwarding the processed message to the output queue is based on an absence of the match to the another workflow process worker.

5. The non-transitory machine-readable storage medium of claim 1, wherein the non-transitory machine-readable storage medium further comprises instructions that are executable to cause the processing resource to:
    iteratively perform a corresponding workflow process at a corresponding workflow process worker, return the processed message to the workflow queue, and evaluate, by the policy workflow worker, the processed message against the pre-defined workflow until, based on the evaluation, the processed message is forwarded to the output queue.

6. The non-transitory machine-readable storage medium of claim 1, wherein the non-transitory machine-readable medium further comprises instructions that are executable to cause the processing resource to:
generate a new policy workflow worker based on a determination that a threshold associated with the policy workflow worker has been met.

7. A device to process a file according to a pre-defined workflow, the device comprising:
a workflow queue;
a policy workflow worker;
a plurality of workflow process workers, including a first workflow process worker and a second workflow process worker;
a processing resource; and
a non-transitory machine-readable storage medium storing instructions executable by the processing resource to cause the processing resource to:
receive a message at the workflow queue to process the file, wherein the message comprises a workflow identifier that identifies the pre-defined workflow and a file location that identifies a location of the file;
retrieve, at the policy workflow worker, the file based on the file location;
based on the message, forward the message, by the policy workflow worker, to the first workflow process worker that corresponds to the file;
perform, at the first workflow process worker, a first workflow process on the message;
return, by the first workflow process worker, the processed message to the workflow queue, wherein the processed message includes the file and a first result;
evaluate, by the policy workflow worker, the processed message against the pre-defined workflow;
based on the evaluation, forward the processed message, by the policy workflow worker, to the second workflow process worker or an output queue; and
in response to a determination that an amount of time that the first workflow process worker spent to process the message was greater than a threshold, generate an additional workflow process worker to assist the first workflow process worker to process messages from the workflow queue to increase processing efficiency and mitigate bottlenecks at the first workflow process worker.

8. The device of claim 7, wherein to forward the message to a first workflow process worker, the instructions are executable to cause the processing resource to:
access the pre-defined workflow associated with the workflow identifier;
evaluate the file against the pre-defined workflow; and
based on a match to the first workflow process worker of the plurality of workflow process workers, append to the message a current workflow state.

9. The device of claim 8, wherein to evaluate the processed message against the pre-defined workflow, the instructions are executable to cause the processing resource to:
associate the first result with the file;
determine whether a match exists to another workflow process worker of the plurality of workflow process workers; and
update the current workflow state.

10. The device of claim 9, wherein the instructions are executable to cause the processing resource to forward the processed message to the second workflow process worker based on an existence of the match to the another workflow process worker and wherein the instructions are executable to cause the processing resource to forward the processed message to the output queue based on an absence of the match to the another workflow process worker.

11. The device of claim 7, wherein the non-transitory machine-readable storage medium further store instructions that are executable to cause the processing resource to:
iteratively perform a corresponding workflow process at a corresponding workflow process worker, return the processed message to the workflow queue, and evaluate the processed message against the pre-defined workflow until, based on the evaluation, the processed message is forwarded to the output queue.

12. The device of claim 7, wherein the non-transitory machine-readable storage medium further store instructions that are executable to cause the processing resource to:
generate a new policy workflow worker based on a determination that a threshold associated with the policy workflow worker has been met.

13. A method of processing a file according to a pre-defined workflow, the method comprising:
receiving a message at a workflow queue to process the file, wherein the message comprises a workflow identifier that identifies the pre-defined workflow and a file location that identifies a location of the file;
based on the message, forwarding the message, by a policy workflow worker, to a first workflow process worker that corresponds to the file;
performing, at the first workflow process worker, a first workflow process on the message;
returning, by the first workflow process worker, the processed message to the workflow queue, wherein the processed message includes the file and a first result;
evaluating, by the policy workflow worker, the processed message against the pre-defined workflow;
based on the evaluation, forwarding the processed message, by the policy workflow worker, to a second workflow process worker or an output queue;
iteratively performing a corresponding workflow process at a corresponding workflow process worker, returning the processed message to the workflow queue, and evaluating the processed message against the pre-defined workflow until, based on the evaluation, the processed message is forwarded to the output queue; and
in response to a determination that an amount of time that the first workflow process worker spent to process the message was greater than a threshold, generating an additional workflow process worker to assist the first workflow process worker to process messages from the workflow queue to increase processing efficiency and mitigate bottlenecks at the first workflow process worker.

14. The method of claim 13, wherein forwarding the message to the workflow process worker further comprises:
retrieving the file based on the file location;
accessing the pre-defined workflow associated with the workflow identifier;
evaluating the file against the pre-defined workflow; and
based on a match to the first workflow process worker of a plurality of workflow process workers, appending to the message a current workflow state.

15. The method of claim 14, wherein evaluating the processed message against the pre-defined workflow further comprises:
  associating the first result with the file;
  determining whether a match exists to another workflow process worker of the plurality of workflow process workers; and
  updating the current workflow state.

16. The method of claim 15, wherein forwarding the processed message to the second workflow process worker is based on the existence of the match to the another workflow process worker and wherein forwarding the processed message to the output queue is based on an absence of the match to the another workflow process worker.

17. The method of claim 13, further comprising:
  generating a new policy workflow worker based on a determination that a threshold associated with the policy workflow worker has been met.

\* \* \* \* \*